S. TURNER.
NECKTIE HOLDER.
APPLICATION FILED JUNE 18, 1914.
1,122,337.
Patented Dec. 29, 1914.
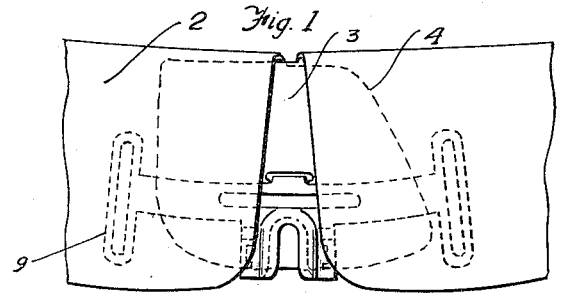
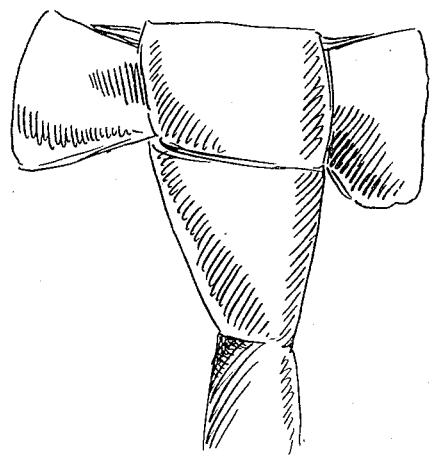
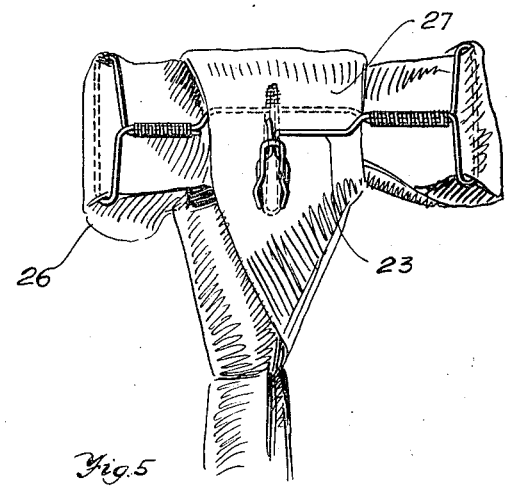
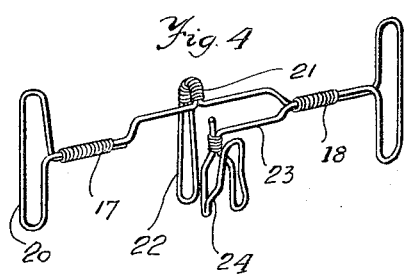
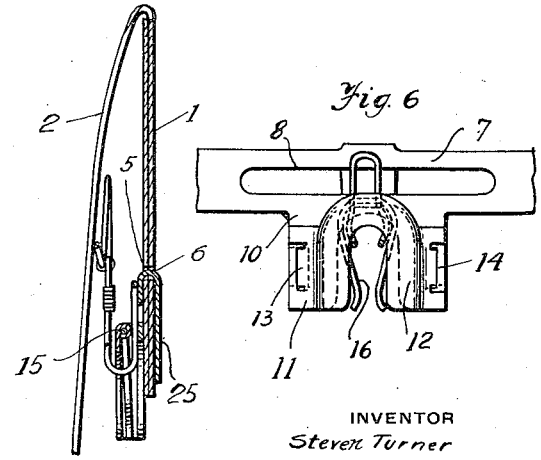
WITNESSES
Samuel Payne.
Ralph Donath.
INVENTOR
Steven Turner
Henry C. Evert
ATTORNEYS

UNITED STATES PATENT OFFICE.

STEVEN TURNER, OF NEW YORK, N. Y.

NECKTIE-HOLDER.

1,122,337.  Specification of Letters Patent.  Patented Dec. 29, 1914.

Application filed June 18, 1914. Serial No. 845,886.

*To all whom it may concern:*

Be it known that I, STEVEN TURNER, a subject of the King of Hungary, residing at New York, in the county of New York and State of New York, have invented certain new and useful Improvements in Necktie-Holders, of which the following is a specification, reference being had therein to the accompanying drawing.

This invention relates to necktie holders, and has for its object to provide a device of such class, in a manner as hereinafter set forth, for connecting to a collar a necktie of the four-in-hand type without passing a portion of the tie around the collar between the folds thereof, the said means further providing for the connecting of the ends of the collar together thereby dispensing with the employing of a collar button.

Further objects of the invention are to provide a combined collar connecting device and necktie holder, which is simple in its construction and arrangement, readily positioned with respect to the collar and tie, strong, durable, efficient and convenient in its use, and inexpensive to manufacture.

With the foregoing and other objects in view, the invention consists of the novel construction, combination and arrangement of parts as hereinafter more specifically described and illustrated in the accompanying drawings wherein is shown an embodiment of the invention, but it is to be understood that changes, variations and modifications can be resorted to which come within the scope of the claims hereunto appended.

In the drawings wherein like reference characters denote corresponding parts throughout the several views: Figure 1 is an elevation of the front of a collar showing the ends thereof connected by a device in accordance with this invention, Fig. 2 is a front elevation of the necktie when tied and connected to the holder, which is adapted to be attached to the collar connecting device, Fig. 3 is a rear elevation of Fig. 2, Fig. 4 is a perspective view of the necktie holder, Fig. 5 is a vertical sectional view of a holder illustrating the connecting device therefor and the necktie holder in position, and Fig. 6 is an elevation showing portions of the collar connecting device and the necktie holder attached together.

Referring to the drawings in detail, 1 denotes the rear fold and 2 the front fold of a collar, 3 one of the ends and 4 the other end of the collar and when the collar is closed, the said ends overlap. The ends 3 and 4 are provided with alining openings 5 and 6 respectively and which are generally employed for the passage of a collar button, but in this instance are used for the passage of the coupling member of the collar connecting device.

The collar connecting device consists of a curved body portion 7, formed of metallic material and provided with a longitudinal slot 8. Each end of the body portion 7 has an enlarged loop 9, which if desired can be secured to the rear fold of the collar. The body portion 7 has a depending arm 10 which is bifurcated centrally, and secured to the arm 10 is a member 11, offset as at 12 to provide in connection with the arm 10 a U-shaped pocket 12. The member 11 is slitted at each side to provide tongues 13, which extend through openings 14 in the arm 10, and are clenched whereby the member 11 is fixedly secured to the arm 10. The upper part of the pocket 12 is provided with an opening 15 for a purpose to be presently referred to. Arranged within the pocket 12 is a resilient holding member 16, the latter being substantially pear-shaped and its function will be presently referred to.

The necktie holding element of the device comprises a pair of arms 17 and 18, and each of which is provided at its outer end with a loop 20. The arms 17 and 18 are connected together at their inner termini as at 21 and the connecting portion is bent downwardly as at 22 to form what may be termed a holding tongue, and which is arranged forwardly of the arms 17 and 18. Projecting from the arm 18 and arranged rearwardly with respect to said arms is a suspension member 23, which terminates in a coupling member 24, the latter being adapted to extend up through the pocket 12, and project forwardly with respect to the body portion 7 of the collar connecting device. The resilient member 16 maintaining the coupling member 24 in the pocket 12 as illustrated in Fig. 6.

The body portion 7 of the connecting device has projecting centrally of its top edge a coupling tongue 25, which is adapted to extend through the openings 5, 6, and be positioned at the rear of the end 4, in a manner as illustrated in Fig. 5, and under such conditions the ends 3, 4, of the collar are connected together. The inner portions of the arms 17 and 18 are offset with respect to the outer portions and the suspension member 23 is offset with respect to the arm 18.

The neckwear is adapted to be tied upon the holder, and it passes through the loops 20 as indicated at 26. The arms 17 and 18 are arranged inwardly of the fold 27 of the tie, while the suspension member 23 is arranged rearwardly with respect to the fold 27. The holder not only maintains the neckwear when tied, but also constitutes a means for coupling it to the connecting device.

When the collar connecting device is in the position as shown in Fig. 1, the holder with the tie thereon is adapted to be attached to the connecting device and with the lateral portions of the neck-wear when tied extend between the folds of the collar, but with the coupling tongue 24 attached to the connecting member in a manner as illustrated in Fig. 5.

What I claim is:—

1. A device for the purpose set forth comprising a collar connecting device adapted to couple the ends of a collar together and provided with a pocket having a resilient retaining member, and a neckwear holder adapted to have the neckwear tied thereon and including a coupling member adapted to extend over said pocket and to be engaged by said resilient retaining member whereby the holder is attached to said connecting device.

2. A device for the purpose set forth comprising a collar connecting device adapted to couple the ends of a collar together and provided with a pocket having a resilient retaining member, and a necktie holder including loops and arms for maintaining the neckwear tied thereon and further including a coupling member suspended from one of said arms and adapted to extend through said pocket and to be engaged by said resilient retaining member whereby the holder is attached to said connecting device.

In testimony whereof I affix my signature in the presence of two witnesses.

STEVEN TURNER.

Witnesses:
 ORPAXE TRUX,
 GEORGE ELDRIDGE.

Copies of this patent may be obtained for five cents each, by addressing the "Commissioner of Patents, Washington, D. C."